US011869741B2

(12) United States Patent
Bausch et al.

(10) Patent No.: US 11,869,741 B2
(45) Date of Patent: Jan. 9, 2024

(54) SWITCHING DEVICE WITH EFFECTIVE COOLING OF OUTFLOWING GASES

(71) Applicant: Eaton Intelligent Power Limited, Dublin (IE)

(72) Inventors: Christoph Bausch, Bonn (DE); Julia Otte, Cologne (DE); Kai Schroeder, Niederkassel (DE); Ute Molitor, Bonn (DE)

(73) Assignee: EATON INTELLIGENT POWER LIMITED, Dublin (IE)

(*) Notice: Subject to any disclaimer, the term of this patent is extended or adjusted under 35 U.S.C. 154(b) by 164 days.

(21) Appl. No.: 17/432,112

(22) PCT Filed: Feb. 18, 2020

(86) PCT No.: PCT/EP2020/054268
§ 371 (c)(1),
(2) Date: Aug. 19, 2021

(87) PCT Pub. No.: WO2020/169623
PCT Pub. Date: Aug. 27, 2020

(65) Prior Publication Data

US 2022/0139643 A1 May 5, 2022

(30) Foreign Application Priority Data

Feb. 20, 2019 (GB) ..................................... 1902314

(51) Int. Cl.
*H01H 9/30* (2006.01)
*H01H 9/34* (2006.01)
*H01H 73/18* (2006.01)

(52) U.S. Cl.
CPC ............ *H01H 9/342* (2013.01); *H01H 73/18* (2013.01); *H01H 2009/305* (2013.01)

(58) Field of Classification Search
CPC ........ H01H 9/342; H01H 9/345; H01H 9/346; H01H 2009/305; H01H 2009/343; H01H 73/18
(Continued)

(56) References Cited

U.S. PATENT DOCUMENTS 4,748,301 A 5/1988 Goldman et al.
5,889,249 A 3/1999 Rival et al.
(Continued)

FOREIGN PATENT DOCUMENTS

EP 1939904 A2 7/2008

*Primary Examiner* — William A Bolton
(74) *Attorney, Agent, or Firm* — LEYDIG, VOIT & MAYER, LTD.

(57) ABSTRACT

A switching device includes an arc extinguishing chamber, an orifice for outflow of the gases from the arc extinguishing chamber, and a multilayer wire cloth or fabric having at least a first wire layer and a second wire layer. The first wire layer and the second wire layer have a respective cloth or fabric structure including respective warp yarns and weft yarns. The first and second wire layers are disposed in a stacked configuration in the orifice such that a weaving direction of the warp yarns of the first wire layer is rotated by an angle in relation to a weaving direction of the warp yarns of the second wire layer, and a weaving direction of the weft yarns of the first wire layer is rotated by an angle in relation to a weaving direction of the weft yarns of the second wire layer.

9 Claims, 6 Drawing Sheets

(58) Field of Classification Search
USPC .... 218/1, 15, 34, 46, 76, 81, 149, 150, 156, 218/157–158; 162/348; 139/383
See application file for complete search history.

(56) References Cited

U.S. PATENT DOCUMENTS

| | | | | |
|---|---|---|---|---|
| 8,026,189 | B1 * | 9/2011 | Pryne | D03D 15/513 442/205 |
| 8,067,097 | B2 * | 11/2011 | Mueller | F02K 1/827 180/290 |
| 8,899,276 | B2 * | 12/2014 | Takahashi | D03D 3/00 139/383 R |
| 10,066,325 | B2 * | 9/2018 | Finn | D03D 15/587 |
| 10,134,537 | B2 * | 11/2018 | Fonseca | H01H 9/342 |
| 2007/0138346 | A1 * | 6/2007 | Edelmeier | H05K 3/1225 245/2 |
| 2012/0328419 | A1 * | 12/2012 | Riggi, Jr. | B23K 15/006 277/654 |
| 2015/0136740 | A1 * | 5/2015 | Afshari | H01H 9/342 218/157 |
| 2016/0240337 | A1 | 8/2016 | Fonseca et al. | |
| 2017/0233903 | A1 * | 8/2017 | Jeon | D03D 15/00 139/425 R |
| 2017/0319881 | A1 * | 11/2017 | Barz | A62C 4/00 |
| 2019/0035580 | A1 * | 1/2019 | Rival | H01H 9/342 |

* cited by examiner

SWITCHING DEVICE WITH EFFECTIVE COOLING OF OUTFLOWING GASES

CROSS-REFERENCE TO PRIOR APPLICATIONS

This application is a U.S. National Phase application under 35 U.S.C. § 371 of International Application No. PCT/EP2020/054268, filed on Feb. 18, 2020, and claims benefit to British Patent Application No. GB 1902314.2, filed on Feb. 20, 2019. The International Application was published in English on Aug. 27, 2020 as WO 2020/169623 under PCT Article 21(2).

FIELD

The disclosure relates to a switching device with effective cooling of gases outflowing from an arc extinguishing chamber of the switching device when a separation of contacts of the switching device takes place.

BACKGROUND

A switching device can be a circuit breaker or a contactor. A circuit breaker is an electrical switch that is used to protect an electrical circuit from damage caused by the occurrence of a short circuit or by a large current that is lower than the current in the case of the short circuit but large enough to damage the electrical circuit. A contactor is an electrical switch that is used to switch a current on and off. Together with the protecting device, for example a fuse or a circuit breaker, the contactor has to cut the current in short circuit and overload cases.

The switching device comprises a moveable contact and a stationary contact. The moveable contact may be moved in a closed and open state. In the closed state, the movable contact is in electrical contact with the stationary contact of the switching device so that the switching device allows a current flow from an input terminal to an output terminal of the switching device. In an open state of the switching device, the moveable contact is separated from the stationary contact so that the flow of current between the input and output terminals of the switching device is interrupted.

When a separation of the moveable and stationary contact takes place, an arc is generated and produces breaking gases. These gases go through an extinguishing chamber of the switching device. The breaking gases usually flow out through an orifice of the switching device. The ionized hot gases transport fine particles from the housing and the contacts of the switching device out of the housing. The outflowing composite of the ionized breaking gases and the fine particles can ignite outside the housing, and the particle dust can burn explosively. The explosive combustion creates pressure that can damage tightly casing housings, bulkheads and adjacent equipment of the switching device. The combustion may affect the switching device itself and the surrounding components. Outflowing particles and combustion residues, for example, can be deposited as a layer on surrounding components, reducing isolation properties.

US 2016/240337 A1, EP 1 939 904 A2 and U.S. Pat. No. 5,889,249 A relate to electric circuit breakers, where a cloth filter member is arranged near an outlet of the circuit breakers to capture debris and to perform cooling of breaking gases generated when separation of the contacts take place.

U.S. Pat. No. 4,748,301 A relates to an electric circuit breaker comprising an arc chute that contains a plurality of spaced plates supported by side and back supports, wherein layers of the side supports comprise a plurality of woven cloth or glass fibers.

SUMMARY OF THE INVENTION

In an embodiment, the present invention provides a switching device with effective cooling of outflowing gases, comprising: an arc extinguishing chamber; an orifice for outflow of the gases from the arc extinguishing chamber; and a multilayer wire cloth or fabric comprising at least a first wire layer and a second wire layer, the first wire layer and the second wire layer having a respective cloth or fabric structure comprising respective warp yarns and weft yarns, wherein the first wire layer and the second wire layer are disposed in a stacked configuration in the orifice such that a weaving direction of the warp yarns of the first wire layer is rotated by an angle in relation to a weaving direction of the warp yarns of the second wire layer, and a weaving direction of the weft yarns of the first wire layer is rotated by an angle in relation to a weaving direction of the weft yarns of the second wire layer so that the cloth or fabric structure of the second wire layer is oriented in a direction other than a direction of the cloth or fabric structure of the first wire layer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
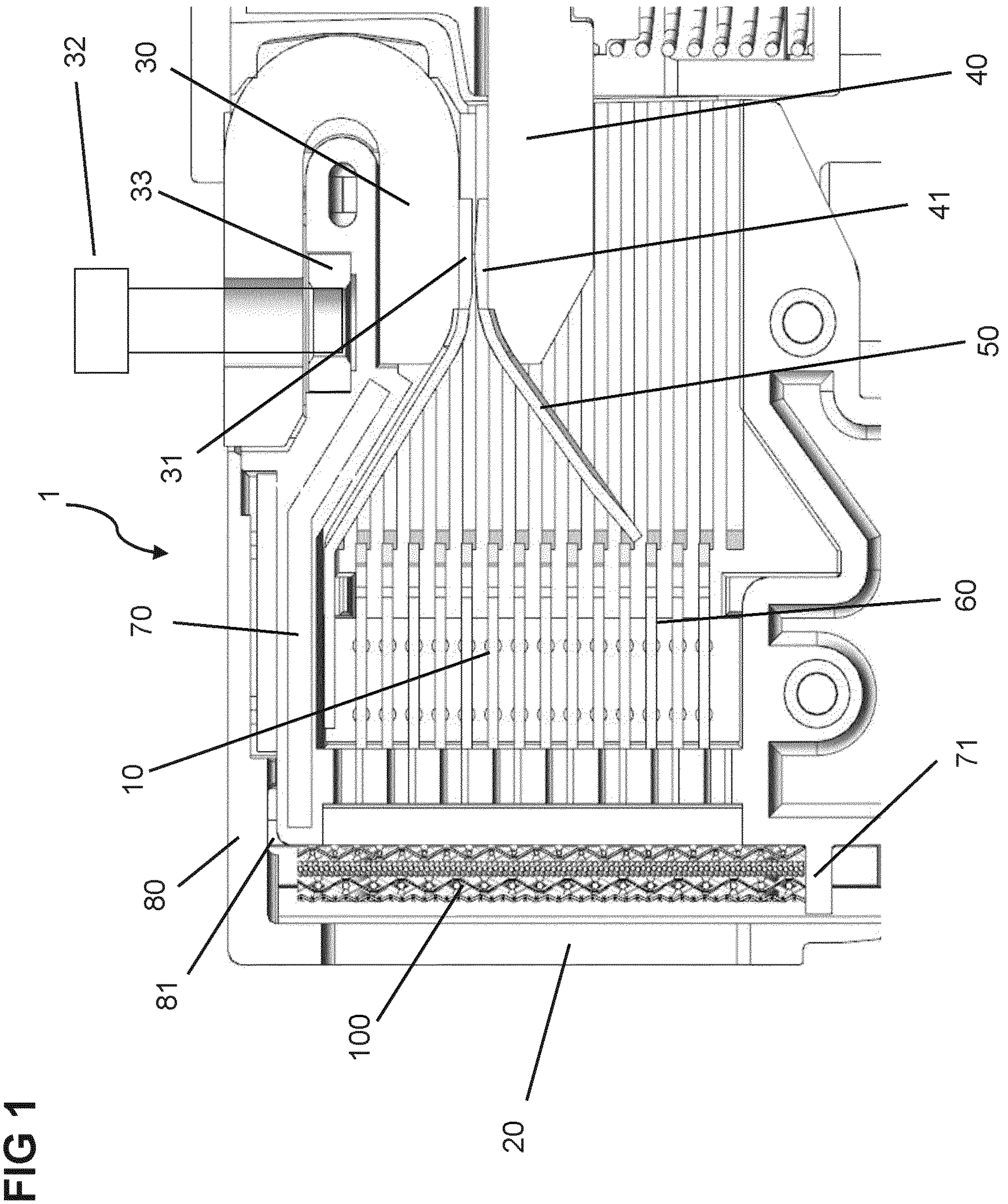
FIG. 1 shows a cross-sectional side view of a switching device with effective cooling of outflowing breaking gases.

In an embodiment, the present invention provides a switching device with effective cooling and filtering of outflowing gases so that an ignition and explosive combustion of the breaking gases outside of the switching device can be prevented as far as possible.

An embodiment of a switching device with effective cooling of outflowing gases is described herein.

According to an embodiment of the switching device, the switching device comprises an arc extinguishing chamber and an orifice for the outflow of the breaking gases from the arc extinguishing chamber. The switching device further comprises a multilayer wire cloth or (knitted) fabric comprising at least a first wire layer and at least a second wire layer. The at least first and the second wire layer have a respective cloth or fabric structure. The at least first wire layer and the at least second wire layer are disposed in a stacked configuration in the orifice in a way that the cloth or fabric structure of the at least second wire layer is oriented in another direction than the cloth or fabric structure of the at least first wire layer.

According to an advantageous embodiment, one of the at least first and second wire layer of the multilayer wire cloth or fabric is layered with one weaving direction rotated by 90° in comparison to the weaving direction of the adjacent one of the first and second wire layer. This ensures that a defined equal distance can be maintained between the layers of the multilayer wire cloth or fabric. If the warp wire and the weft wire are nearly equal in diameter and distance, a rotation being greater than 0° and less than 90° must be selected to keep a constant thickness.

By stacking the various wire layers of the multilayer wire cloth or fabric with the at least second wire layer being arranged rotated in relation to the at least first wire layer, it can be further ensured that a direction of flow of the breaking gases flowing out through the orifice of the switching device changes from the at least first wire layer to the at least second rotated wire layer. The change of direction of the outflowing gases leads to a greater cooling effect of the outflowing breaking gases with small dimensions of the gas deionization device being embodied as the multilayer wire cloth or fabric.

The multilayer wire cloth or fabric is disposed in the orifice with a defined orientation. According to an advantageous embodiment the fabric layer of the at least first wire layer facing the extinguishing chamber has a coarse cloth/fabric structure, while the at least second wire layer facing the outside of the switching device has a fine cloth/fabric structure. Due to the fact that the fabric layers become increasingly finer towards the outside, the multilayer wire cloth or fabric provides a filter effect occurring towards the outside.

To ensure that the multilayer wire cloth or fabric can be installed in the orifice in the correct orientation, the multilayer wire cloth or fabric has a contour being different from the contour of an adjacent side of the cloth or fabric, for example a set bevel/chamfered edge, at at least one of the corners of the multilayer wire cloth or fabric. The surrounding housing is formed in the area of the orifice in such a way that an inversely shaped contour of the inner wall of the orifice fits the set bevel of the multilayer wire cloth or fabric. This ensures that the multilayer wire cloth or fabric cannot be installed in the wrong way in the orifice of the switching device.

According to another advantageous embodiment of the switching device, the surrounding housing parts of the switching device forming the orifice comprise protruding ribs which are configured to support the multilayer wire cloth or fabric. This configuration ensures that the multilayer wire cloth or fabric can be loosely disposed in the orifice so that a supporting frame to hold the multilayer wire cloth or fabric in the orifice is not necessary. The loosely disposed multilayer wire cloth or fabric advantageously contributes to a cost-effective production of the switching device.

In order to further facilitate production of the multilayer wire cloth or fabric, the individual fabric layers may be connected to each other by pressing the fabric layers of the multilayer wire cloth at certain locations over a small area and welding them together at these points. The pressing and welding can be carried out in one manufacturing operation.

FIG. 1 shows an embodiment of a switching device 1 with effective cooling of outflowing breaking gases. The switching device 1 comprises a stationary/fixed contact 30 having a contact plate 31 and a moveable contact 40 having a contact plate 41. In the open configuration of the switching device, the moveable contact 40 is electrically isolated from the stationary contact 30. In the closed configuration, the moveable contact 40 is in electrical contact with the stationary contact 30 so that contact plates 31 and 41 are in contact with each other.

The switching device comprise terminals for fixing electrical wires to connect the switching device to an electrical circuit. FIG. 1 shows a screw 32 fixed by a nut 33 to a terminal side of port 30. In a closed state of the switching device, a current flows through the switching device from one of the terminals via the connection of the stationary and the moveable contact to the other one of the terminals. In the case of a short circuit in the electrical circuit to which the switching device is connected, the high current flowing through the switching device is interrupted by separating the moveable contact 40 from the stationary contact 30. In this case an electric arc is generated between the contact plates 31 and 41 and the amount of gas is so large that explosive combustion may occur.

In order to provide a propagation path for the arc, the switching device 1 comprises arc runners 50 leading an arc to an extinguishing chamber 10. The arc extinguishing chamber 10 comprises a stack of cooling plates 60 which divide and cool the arc. By splitting the arc into smaller arcs within the arc extinguishing chamber 10, the arc is cooled down while the arc voltage is increased and serves as an additional impedance which limits the circuit through the switching device.

When separation of the moveable and stationary contacts 40 and 30 takes place, breaking ionized gases are generated in the arc extinguishing chamber 10. The switching device 1 comprises an orifice 20 for the outflow of the breaking gases from the arc extinguishing chamber 10. The switching device 1 further comprises a multilayer wire cloth or fabric 100 being disposed in the orifice 20. The multilayer wire cloth or fabric 100 is designed to perform cooling of the breaking gases so that an ignition and an explosive combustion of the gases outside of the switching device can be effectively prevented.

Figure 2:
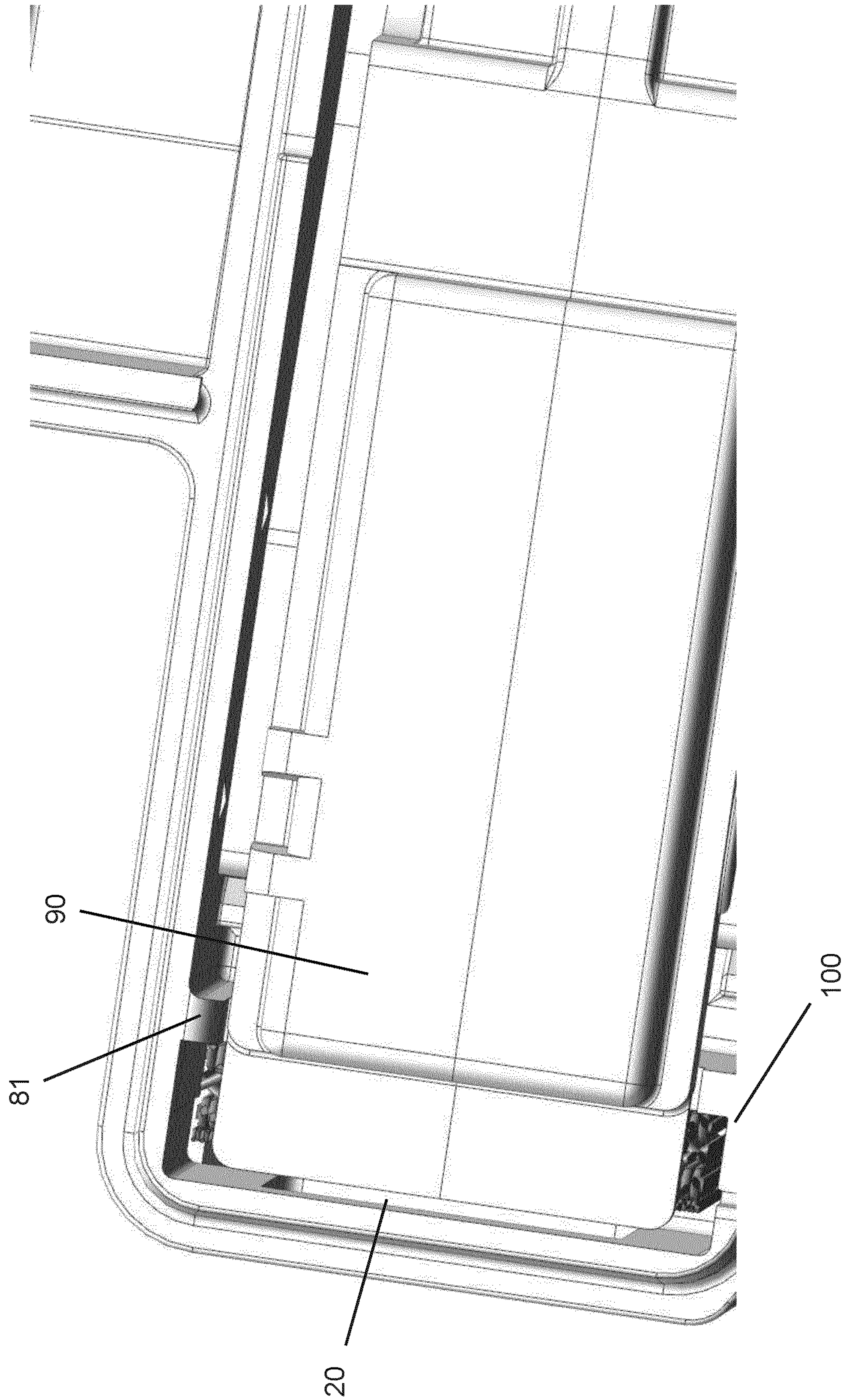
FIG. 2 shows a cross-sectional bottom view of a switching device with effective cooling of outflowing breaking gases.
Figure 3:
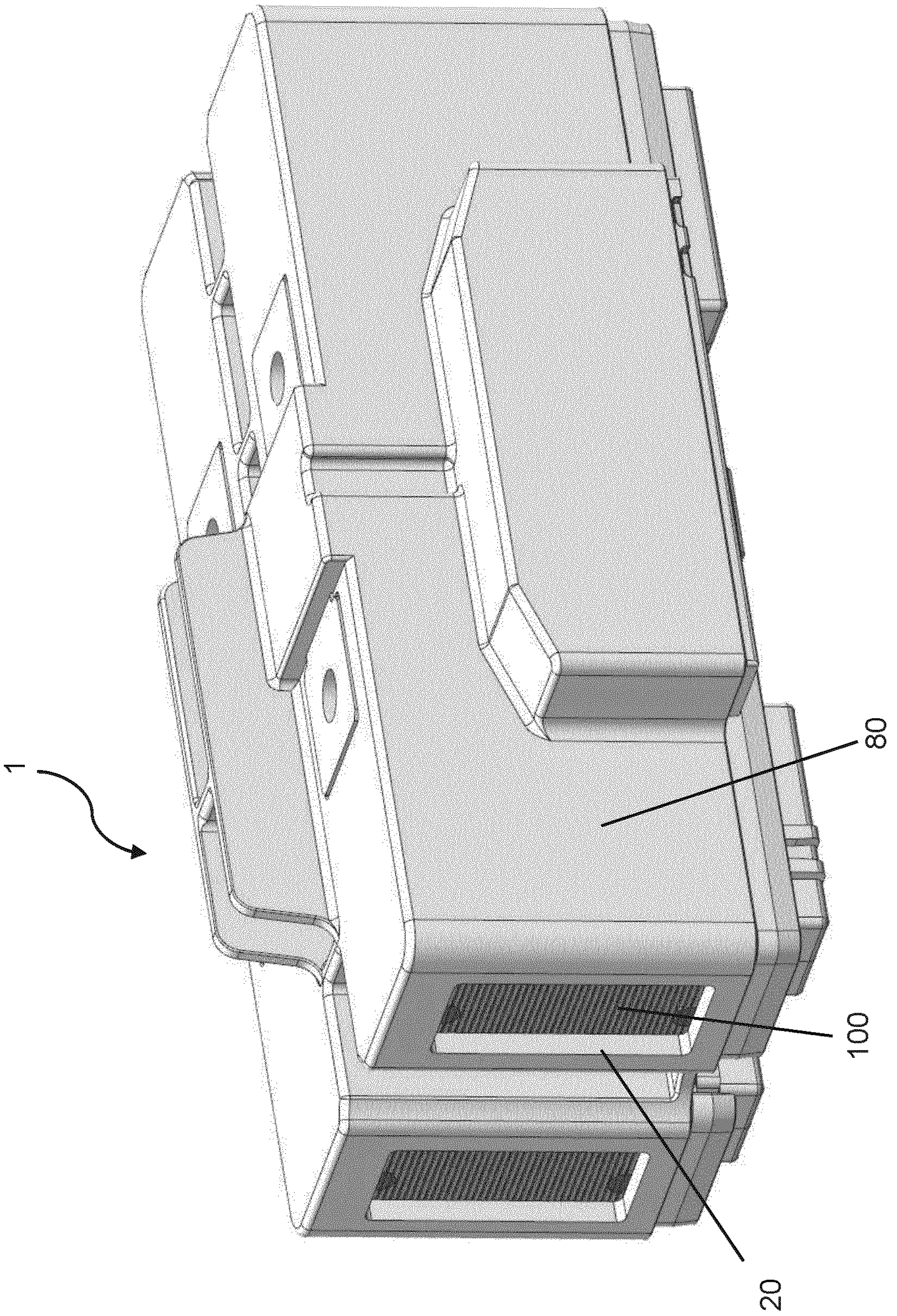
FIG. 3 shows a perspective view on a housing of a switching device with effective cooling of outflowing breaking gases.

FIG. 2 shows a cross-sectional view of the switching device 1 from the bottom side. A bottom plate 90 covers the arc extinguishing chamber and the multilayer wire cloth or fabric 100. FIG. 3 shows a perspective view of the switching device 1 with the multilayer wire cloth or fabric 100 being disposed in the orifice 20. The orifice 20 is configured as an opening in an outer part 80, for example a covering element, of the housing of the switching device.

Figure 4C:
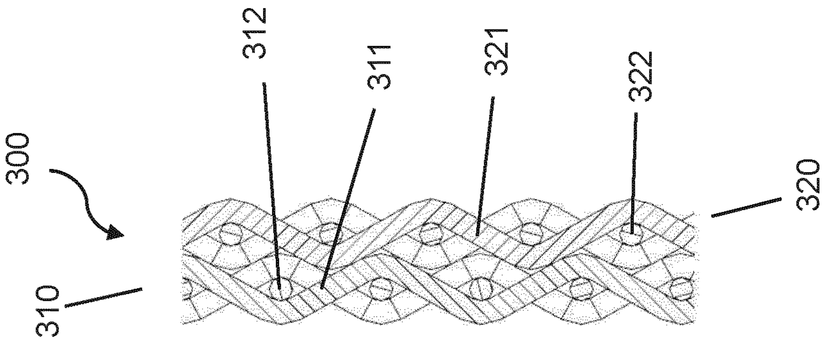
FIG. 4C illustrates a multilayer wire cloth/fabric.
Figure 4B:
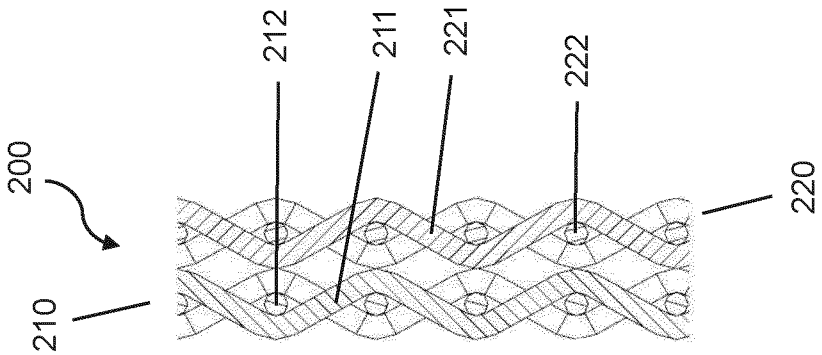
FIG. 4B illustrates a multilayer wire cloth/fabric.
Figure 4A:
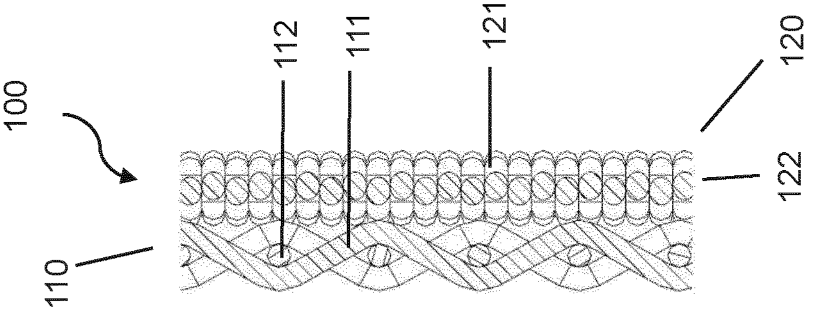
FIG. 4A shows an enlarged cross-sectional view of an embodiment of a multilayer wire cloth/fabric to be disposed in an orifice of a switching device.

FIG. 4A illustrates a cross-sectional view of the multilayer wire cloth or fabric 100 in an enlarged view. The multilayer wire cloth or fabric 100 comprises at least a first wire layer 110 and at least a second wire layer 120. The at least first and the second wire layers have a respective cloth/fabric structure. The at least first wire layer 110 and the at least second wire layer 120 are disposed in a stacked configuration as shown in FIGS. 1 and 4A, in the orifice 20. In the stacked configuration of the multilayer wire cloth or fabric, the first wire layer may be disposed directly adjacent the second wire layer. As further illustrated in FIGS. 1 and 4A, the stacked configuration of the multilayer wire cloth or fabric 100 is embodied such that the cloth/fabric structure of the at least second wire layer 120 is oriented in another direction than the cloth/fabric structure of the at least first wire layer 110.

According to a possible embodiment of the multilayer wire cloth or fabric 100, each of the cloth/fabric structure of the at least first wire layer 110 and the at least second wire layer 120 comprises a plurality of warp yarns 111, 121 and weft yarns 112, 122. The respective weft yarns 112, 122 of the at least first and second wire layer 110, 120 are configuration as parallel straight wire yarns in the respective cloth/fabric structure of the at least first and second wire layer 110, 120. The respective warp yarns 111, 121 of the at least first and second wire layer 110, 120 are configured as undulated wire yarns in the respective cloth/fabric structure of the at least first and second wire layer 110, 120. The respective warp yarns 111, 121 pass alternating over and under the successive weft yarns 112, 122.

According to an advantageous embodiment, at least one of the wire layers of the multilayer wire cloth or fabric 100 is arranged in the stacked configuration of the wire layers with its weaving direction of warp yarns and weft yarns rotated by an angle in relation to the other wire layers. The at least one rotated wire layer may, for example, be rotated in the stacked configuration of the plurality of wire layers, for example, by 90° in relation to the at least one other wire layer, for example in relation the at least one adjacent wire layer.

The arrangement of at least one of the wire layers in another direction in comparison to the remainder of the wire layers ensures that a direction of flow of the breaking gases out of the extinguishing chamber 10 through the orifice 20 changes within the multilayer wire cloth or fabric 100. The deflection of the gas flow within the multilayer wire cloth or fabric 100 enables an effective cooling of the breaking gases when flowing through the multilayer wire cloth or fabric.

FIG. 4B and FIG. 4C illustrate another embodiment of a multilayer wire cloth or fabric 100, wherein adjacent wire layers 210 and 220 (FIG. 4B) or adjacent wire layers 310 and 320 (FIG. 4C) are arranged in the same orientation. In the embodiment shown in FIG. 4B, the wire layers 210 and 220 are arranged above each other such that respective hills of warp yarns 211, 221 of the adjacent wire layers 210 and 220, and respective valleys of the warp yarns 211, 221 of the adjacent wire layers 210 and 220 are placed above each other which leads to the same thickness, a higher pore size and a lower pressure drop of the multilayer wire cloth or fabric 200. Referring to FIG. 4C, the wire layers 310 and 320 are placed above each other such that respective valleys and hills of warp yarns 311, 321 of adjacent wire layers are offset to each other in comparison to the wire layers 210 and 220 of FIG. 4B so that the multilayer wire cloth or fabric 300 has a smaller thickness, a lower pore size and a higher pressure drop in comparison to the multilayer wire cloth or fabric 200. In conclusion, as illustrated in FIGS. 4B and 4C, the thickness of the multilayer wire cloth or fabric 200 and 300 depends on the arrangement of the wire layers.

The arrangement of the at least first wire layer 110 and the at least second wire layer 120 of FIG. 4A ensures that the multilayer wire cloth or fabric 100 can be manufactured with a defined thickness, a defined pore size and a defined pressure drop. Moreover, the stacked configuration of the multilayer wire cloth or fabric 100 with different orientation of one of the wire layers in comparison to another one of the wire layers, in particular a directly adjacent wire layer, ensures that the multilayer wire cloth or fabric 100 can be provided with a defined equal distance between the wire layers.

According to an embodiment of the switching device 1, in an orthogonal projection to the stacked configuration of the multilayer wire cloth or fabric 100, the warp yarns 111 in the at least first wire layer 110 are offset in relation to the warp yarns 121 in the at least second wire layer 120 by a defined angle, for example up to 90°. This means that, in the orthogonal projection to the stacked configuration of the multilayer wire cloth or fabric 100, the warp yarns 111 of the at least first wire layer 110 are perpendicular to the warp yarns 121 of the at least second wire layer 120. Furthermore, in the orthogonal projection to the stacked configuration of the multilayer wire cloth or fabric 100, the weft yarns 112 in the at least first wire layer 110 are offset in relation to the weft yarns 122 in the at least second wire layer 120 by a defined angle, for example up to 90°. In this case, the weft yarns 112 of the at least first wire layer 110 are arranged perpendicular to the weft yarns 122 of the at least second wire layer 120.

Figure 5:
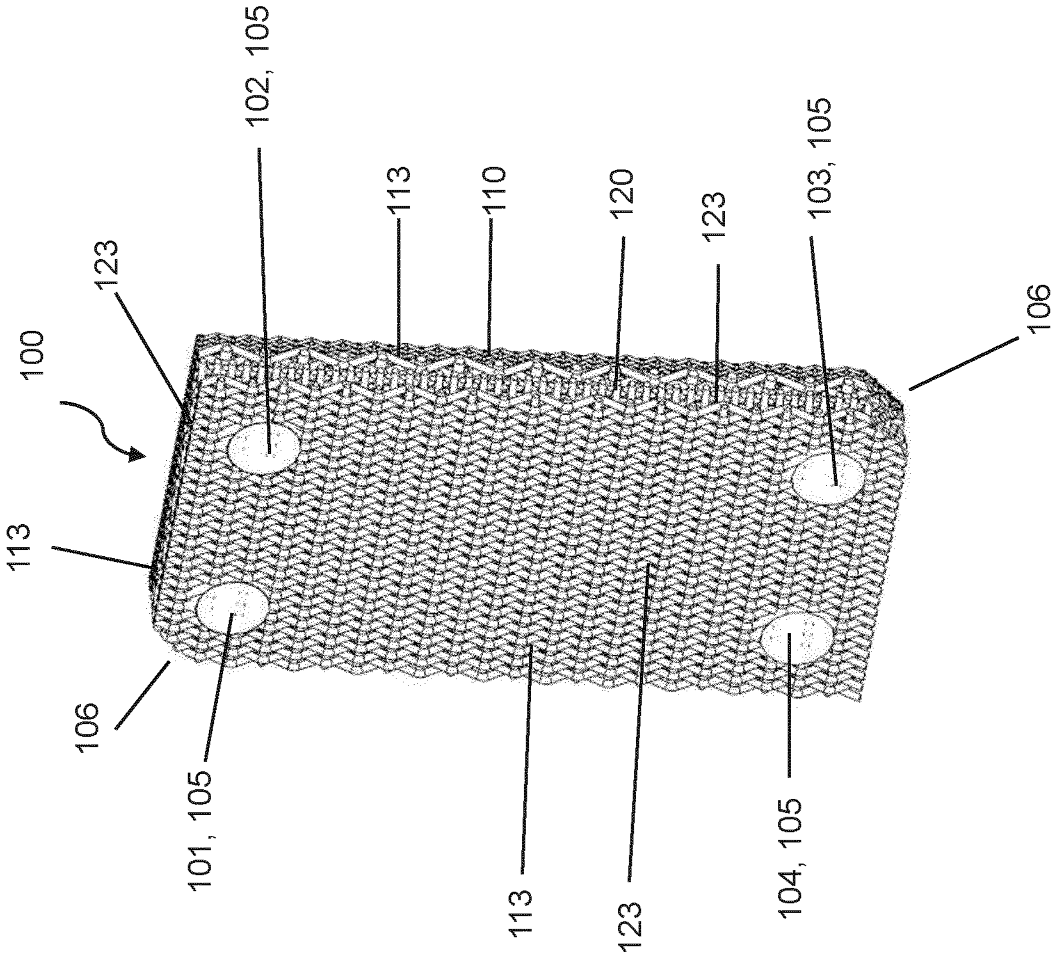
FIG. 5 illustrates a perspective view of an embodiment of a multilayer wire cloth/fabric to be disposed in an orifice of a switching device with effective cooling of outflowing breaking gases.
Figure 6:
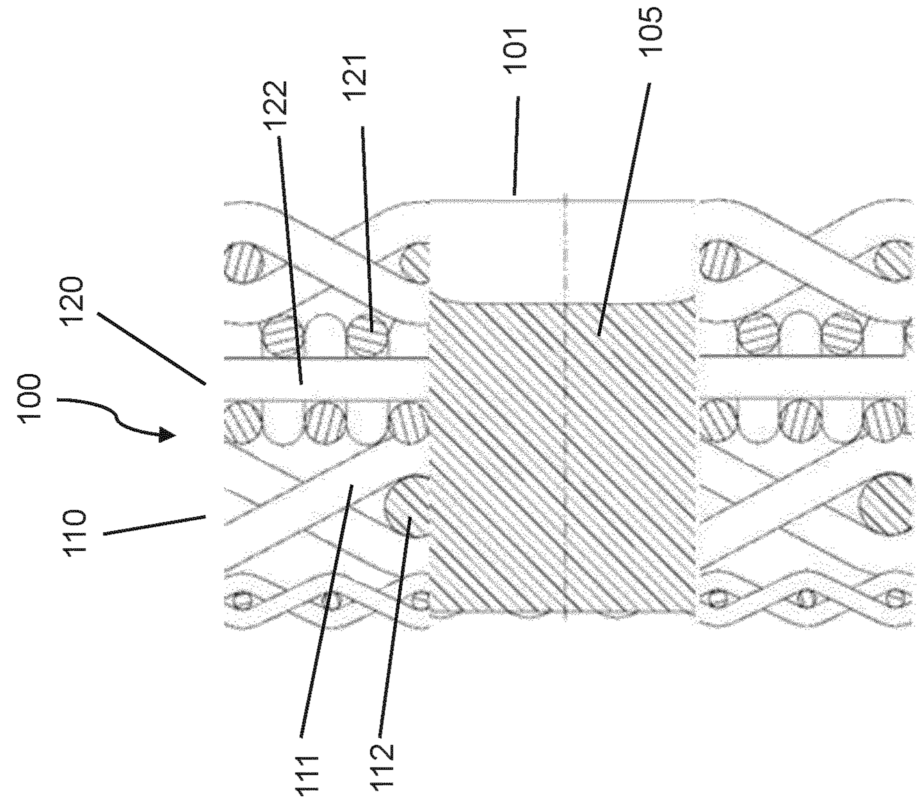
FIG. 6 illustrates an enlarged view of an area of pressed wire layers of a multilayer wire cloth/fabric with a welding connection of the pressed wire layers.

FIG. 5 shows a perspective view of the multilayer wire cloth or fabric 100 comprising the at least first wire layer 110 and the at least second wire layer 120 in a stacked configuration. The cloth/fabric structure of the at least second wire layer 120 is arranged rotated in relation to the cloth/fabric structure of the at least first wire layer 110.

Each of the at least first and second wire layers 110, 120 comprises a plurality of mesh openings 113, 123. The mesh openings are located at the wide and narrow sides of the cloth or fabric 100. The mesh openings 123 of the at least second wire layer 120 are smaller than the mesh openings 113 of the at least first wire layer 110. According to an advantageous embodiment, the multilayer wire cloth or fabric 100 is disposed in the orifice 20 such that the at least first wire layer 110 is arranged closer to the arc extinguishing chamber 10 than the at least second wire layer 120. This ensures that a filter effect occurs in the multilayer wire cloth or fabric 100 towards the outside of the switching device.

In order to manufacture the multilayer wire cloth or fabric 100, the at least first wire layer 110 and the at least second wire layer 120 are pressed together at a plurality of areas 101, 102, 103 and 104 before welding. The at least first wire layer 110 and the at least second wire layer 120 are connected to each other by a respective welding connection 105 provided at the plurality of areas 101, 102, 103 and 104. The plurality of areas 101, 102, 103 and 104 of the multilayer wire cloth or fabric 100 are spaced apart from each other, as shown in FIG. 5. The pressed and welded areas 101, 102, 103 and 104 of the multilayer wire cloth or fabric 100 may be located near the corners of the multilayer wire cloth or fabric 100. The manufacturing method allows to press the various wire layers in a small area which at the same time serve as points to perform the welding between the wire layers. The pressing and welding may be advantageously performed in one operation step.

In order to facilitate and ensure the mounting of the multilayer wire cloth or fabric 100 in the orifice 20 in the right orientation, i.e. with the coarse cloth/fabric structure towards the inside of the switching device and the fine cloth/fabric structure towards the outside of the switching device, the multilayer wire cloth or fabric 100 can have at least a contour 106 which is different from the contour of the adjacent side of the cloth or fabric, for example a chamfered edge, at one of the corners of the multilayer wire cloth or fabric 100. According to the embodiment of the multilayer wire cloth or fabric 100 shown in FIG. 5, contours 106 which are different from the contours of the adjacent sides of the cloth or fabric, for example two chamfered edges are provided at opposite corners of the multilayer wire cloth or fabric 100. The surrounding housings 70 and 80 are provided with an inversely shaped contour so that the multilayer wire cloth or fabric 100 can only be disposed in the housings 70 and 80 in the right, predefined orientation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 switching device
10 arc extinguishing chamber
20 Orifice
30 stationary contact
31 contact plate
32 Screw
33 Nut
40 moveable contact
41 contact plate
50 arc runner
60 cooling plate
70 inner housing part
71 ribs of the inner housing part
80 outer housing part
81 ribs of the outer housing part
90 bottom plate
100, 200, 300 multilayer wire cloth/fabric
101, . . . , 104 pressed connecting areas
105 welding connection
106 contour
110, 120, 210, 220, 310, 320 wire layer
111, 121, 211, 221, 311, 321 warp yarns
112, 122, 212, 222, 312, 322 weft yarns
113, 123 mesh openings

The invention claimed is:

1. A switching device with effective cooling of outflowing gases, comprising:

an arc extinguishing chamber;

an orifice for outflow of the gases from the arc extinguishing chamber; and a multilayer wire cloth or fabric comprising at least a first wire layer and a second wire layer, the first wire layer and the second wire layer having a respective cloth or fabric structure comprising respective warp yams and weft yarns, wherein the first wire layer and the second wire layer are disposed in a stacked configuration in the orifice such that a weaving direction of the warp yarns of the first wire layer is rotated by an angle in relation to a weaving direction of the warp yams of the second wire layer, and a weaving direction of the weft yams of the first wire layer is rotated by an angle in relation to a weaving direction of the weft yams of the second wire layer so that the cloth or fabric structure of the second wire layer is oriented in a direction other than a direction of the cloth or fabric structure of the first wire layer.

2. The switching device of claim 1, wherein, in the stacked configuration of the multilayer wire cloth or fabric, the respective cloth or fabric structure of the first and second wire layer are arranged such that a direction of flow of the gases changes as the gases flow through the multilayer wire cloth or fabric.

3. The switching device of claim 1, wherein, in an orthogonal projection to the stacked configuration of the multilayer wire cloth or fabric, the warp yams in the first wire layer are offset in relation to the warp yarns in the second wire layer by an angle up to 90°, and wherein, in an orthogonal projection to the stacked configuration of the multilayer wire cloth or fabric, the weft yarns in the first wire layer are offset in relation to the weft yarns in the second wire layer by an angle up to 90°.

4. The switching device of claim 1, wherein the respective weft yarns of the first and second wire layer are configured as parallel straight wire yarns in the respective cloth or fabric structure of the first and second wire layer, and wherein the respective warp yarns of the first and second wire layer are configured as undulated wire yarns in the respective cloth or fabric structure of the first and second wire layer, the respective warp yarns passing alternately over and under successive weft yarns.

5. The switching device of claim 4, wherein the first wire layer and the second wire layer are pressed together at the plurality of areas before welding.

6. The switching device of claim 1, wherein, in the stacked configuration of the multilayer wire cloth, the first wire layer and the second wire layer are connected to each other by a respective welding connection provided at a plurality of areas of the multilayer wire cloth or fabric, the plurality of areas being spaced apart from each other.

7. The switching device of claim 1, wherein the multilayer wire cloth or fabric is disposed in the orifice such that the first wire layer is arranged closer to the arc extinguishing chamber than the second wire layer, wherein each of the first and second wire layer comprises a plurality of mesh openings, and wherein the mesh openings of the second wire layer are smaller than the mesh openings of the first wire layer.

8. The switching device of claim 1, wherein the multilayer wire cloth or fabric is loosely disposed in the orifice between ribs of inner and outer parts of a housing of the switching device.

9. The switching device of claim 1, wherein the multilayer wire cloth or fabric has at least a contour at one of a side of the cloth or fabric which is different from a contour of an adjacent side of the cloth or fabric, and wherein a housing surrounding the cloth or fabric is provided with an inversely champed contour.

* * * * *